United States Patent
Babonneau et al.

(10) Patent No.: US 8,392,595 B2
(45) Date of Patent: Mar. 5, 2013

(54) METHOD AND DEVICE FOR ADAPTING A SCALABLE DATA STREAM, CORRESPONDING COMPUTER PROGRAM PRODUCT AND NETWORK ELEMENT

(75) Inventors: Gérard Babonneau, Thorigne-Fouillard (FR); Emmanuel Mory, Betton (FR)

(73) Assignee: France Telecom, Paris (FR)

( * ) Notice: Subject to any disclaimer, the term of this patent is extended or adjusted under 35 U.S.C. 154(b) by 112 days.

(21) Appl. No.: 12/440,622

(22) PCT Filed: Sep. 14, 2007

(86) PCT No.: PCT/FR2007/051942
§ 371 (c)(1),
(2), (4) Date: Mar. 10, 2009

(87) PCT Pub. No.: WO2008/032001
PCT Pub. Date: Mar. 20, 2008

(65) Prior Publication Data
US 2010/0005184 A1    Jan. 7, 2010

(30) Foreign Application Priority Data
Sep. 15, 2006 (FR) ...................................... 06 08104

(51) Int. Cl.
G06F 15/16 (2006.01)
G06F 15/173 (2006.01)
G06F 15/177 (2006.01)
H04N 7/173 (2011.01)

(52) U.S. Cl. ......... 709/231; 709/220; 709/226; 725/116
(58) Field of Classification Search .................. 709/220, 709/226, 231; 725/116
See application file for complete search history.

(56) References Cited

U.S. PATENT DOCUMENTS

| | | | |
|---|---|---|---|
| 6,781,971 B1 * | 8/2004 | Davis et al. | 370/329 |
| 2002/0073238 A1 * | 6/2002 | Doron | 709/246 |
| 2005/0175084 A1 | 8/2005 | Honda et al. | |
| 2006/0156363 A1 * | 7/2006 | Wu et al. | 725/113 |
| 2006/0222078 A1 * | 10/2006 | Raveendran | 375/240.16 |

FOREIGN PATENT DOCUMENTS

| EP | 1 311 125 A2 | 5/2003 |
|---|---|---|
| WO | WO 2006/064454 A1 | 6/2006 |

OTHER PUBLICATIONS

Kang et al., "Multi-layer Active Queue Management and Congestion Control for Scalable Video Streaming," 24th International Conference on Distributed Computing Systems, Tokyo, Japan, Mar. 24-26, 2004, Proceedings, pp. 768-777, Piscataway, NJ, USA, IEEE.

* cited by examiner

Primary Examiner — Peter Shaw
(74) Attorney, Agent, or Firm — Drinker Biddle & Reath LLP

(57) ABSTRACT

The invention relates to a method of adapting a scalable data stream organized in blocks of data units, each comprising at least one basic data unit and at least one enhancement data unit, making it possible to define a plurality of quality and bit rate levels (N1 to N3) depending on the number and the type of data units used, each data unit being initially classified in an initial level selected from said plurality of levels. According to the invention, the method implements a regulation mechanism (8) such that, if a data unit is reclassified in a reclassification level of lower priority than the initial level of said data unit, all the data units that depend on the decoding of said reclassified data unit are also reclassified in reclassification levels where all the data units essential to their decoding are accessible.

9 Claims, 6 Drawing Sheets

METHOD AND DEVICE FOR ADAPTING A SCALABLE DATA STREAM, CORRESPONDING COMPUTER PROGRAM PRODUCT AND NETWORK ELEMENT

CROSS-REFERENCE TO RELATED APPLICATIONS

This application is the U.S. national phase of the International Patent Application No. PCT/FR2007/051942 filed Sep. 14, 2007, which claims the benefit of French Application No. 06 08104 filed Sep. 15, 2006, the entire content of which is incorporated herein by reference.

FIELD OF THE INVENTION

The field of the invention is that of the processing of scalable data streams, also called hierarchical data streams, supplied to users by real-time transportation over a communication network.

More specifically, the invention relates to a method of adapting a scalable data stream to the characteristics of a network and/or of the users.

The invention applies in particular, but not exclusively, to the adaptation of a scalable video stream (for example an MPEG4-svc stream) to the characteristics of the user's and/or his terminal's link.

The MPEG4-SVC technique is in particular described in the documents:

JSVM 2.0: Joint Video Team (JVT) of ISO/IEC MPEG & ITU-T VCEG, N7084, Joint Scalable Video Model (JSVM) 2.0 Reference Encoding Algorithm Description, April 2005, Busan (Julien Reichel, Heiko Schwarz, Mathias Wien); and WD 2: J. Reichel, H. Schwarz, M. Wien—Scalable Video Coding—Working Draft 2—ISO/IEC JTC1/SC29/WG11, W7084, April 2005, Busan.

BACKGROUND OF THE INVENTION

Scalable Video Systems

Currently, most video coders generate a single compressed stream corresponding to all of a coded sequence. Each client wanting to use the compressed file for decoding and viewing must, for that, download (or "stream") the complete compressed file.

Now, in a multivendor system (for example the Internet), not all clients have the same type of access to the data: the bandwidth, the processing capabilities, the screens of the different clients can differ widely (for example, on an Internet network, one of the clients may have a 1024 kb/s ADSL bit rate and a powerful microcomputer (PC) whereas another will have only modem access and a PDA).

An obvious solution to this problem is to generate several compressed streams corresponding to different bit rates/resolutions of the video sequence: such is simulcast. This solution is, however, sub-optimal in terms of effectiveness, and presupposes knowing in advance the characteristics of all the potential clients.

More recently, video coding algorithms have emerged that are said to be scalable, in other words, with adaptable quality and variable space-time resolution, for which the coder generates a stream compressed into several layers, each of its layer being nested in the higher-level layer. These algorithms are currently being adopted as an amendment to MPEG4-AVC (hereinafter called in this document: SVC).

Such coders are very useful for all the applications for which the generation of a single compressed stream, organized in several layers of scalability, can serve several clients with different characteristics, for example:

VOD (Video On Demand), accessible to radio communication terminals of UMTS (Universal Mobile Telecommunication Service) type, to PCs or to television terminals with ADSL access, etc.;

session mobility (for example, resumption on a PDA of a video session begun on a television, or, resumption on a GPRS (General Packet Radio Service) mobile of a session begun on UMTS);

session continuity (in a context of bandwidth sharing with a new application);

high definition television, in which a single video encoding needs to allow both clients that have standard definition SD and clients that have a high definition HD terminal to be served;

video conferencing, in which a single encoding needs to satisfy the requirements of customers who have a UMTS access and Internet access;

etc.

MPEG-4 SVC

The JSVM MPEG model is described in the document JSVM 2.0 cited above. It is based on a scalable coder that is strongly oriented towards AVC-type solutions, in which the schematic structure of a corresponding encoder is presented in FIG. 1. It is a pyramidal structure. The video input components 10 are subjected to a dyadic undersampling (2D decimation by 2 referenced 11, 2D decimation by 4 referenced 12). Each of the undersampled streams then undergoes a time decomposition 13 of MCTF (Motion-Compensated Temporal Filtering) type. A low-resolution version of the video sequence is coded 14 up to a given bit rate which corresponds to the maximum decodable bit rate for the low spatial resolution (this basic level is AVC-compatible).

The higher levels are then coded 19 by subtraction of the reconstructed and undersampled preceding level and coding of the residues in the form of a basic level, and possibly of one or more enhancement levels obtained by multi-pass coding of bit planes (called FGC, standing for "Fine Grain Scalability").

According to this approach, the motion information 17 and the texture information 18 are differentiated. In order to perform a bit rate adaptation, the texture information 18 is coded using a progressive scheme:

coding of a first minimum quality level (called "base layer");

coding of progressive refinement levels (called "enhancement layers").

Referring to FIG. 1, the texture information 18 feeds a coding module 19 of the basic quantization layer. The coded data, output from the module 19, feeds a spatial transformation and entropic coding block 21, which works on the signal's refinement levels. The data output from the module 21 feed an interpolation 20 from the basic level. This interpolation is used for prediction in the coding module 19 of the level situated above. A multiplexing module 22 arranges the different substreams generated in order in a global compressed data stream 23.

The compressed stream 23, output from the coder, is structured in data units called "NALU" ("Network Abstraction Layer Units"). The NALUs are organized in blocks of data units hereinafter called "AU" ("Access Units"). An AU comprises all the NALUs corresponding to one and the same time instant, that is, that have one and the same DTS ("Decoding Time Stamp"), and that therefore belong to one and the same image. Each NALU is associated with an image derived from the space-time decomposition, a spatial resolution level, and a quantization level. This structuring in data units makes it possible to perform a bit rate and/or space-time resolution adaptation by eliminating the NALUs of excessively high spatial resolution, or of excessively high time frequency, or even of excessively high encoding quality.

Technique Described in the French Patent Application FR2854018

The French patent application published under the number FR2854018 describes a technique for controlling data packet traffic entering a network. The traffic comprises N streams and/or substreams each associated with a priority level, N≧2. Each of the packets is marked with the priority level associated with the stream or substream to which it belongs.

In a particular application, the traffic comprises N substreams each corresponding to one of the N hierarchical levels of a hierarchical stream or of an aggregate of hierarchical streams. It is, for example, a hierarchical audio/video stream comprising the following substreams: an audio substream, a basic video substream and an enhancement video substream.

The aim is to process the bursts to control congestions in a network. In practice, the congestions mainly affect the bursts, which contain the most important information of an MPEG-coded stream. This control is particularly suited to ADSL-type networks when the nominal bit rate of the stream is close to the link's maximum bit rate.

The general principle of this known technique is to implement a multi-layer token bucket (MLTB) mechanism. Each level of the MLTB is used to process one of the N priority levels. Each of the packets undergoes a processing according to a marking corresponding to its priority level: it is accepted or rejected depending on whether it is possible or not to assign it tokens according to its priority level. The accepted packets are placed in a buffer memory for packets to be sent, which forms a means of managing a queue. The rejected packets are discarded or, in a variant embodiment, placed in the buffer after having been remarked with a lower priority level (that is, after having been reclassified in a lower priority level). In an exemplary embodiment, the abovementioned MLTB is placed at the input of the buffer for packets to be sent, to control the bursts, and a bucket with a single level is placed at the output, to smooth the traffic (TBTS, standing for "Token Bucket Traffic Shaper").

One drawback of this known technique is that the reclassification of a packet is performed independently of the concept of dependency between packets. In other words, no account is taken of the fact that a packet is reclassified for the processing of the subsequent packets that depend on this reclassified packet.

Another drawback of the known technique is that the reclassification of a packet involves a new marking of this packet (that is, a modification of this packet).

Another drawback of the known technique is that it does not propose any optimal solution for the reclassification of a packet in a lower priority level.

Another drawback of the known technique is that a packet is processed only when it is at the input of the buffer for packets to be sent. It does not propose any processing on the packets already present in the buffer, and because of this, does not require means of differentiating between packets present in the buffer and having one and the same priority level (no weighting of the packets).

Yet another drawback of the known technique is that it does not envisage having the packets leaving the buffer of packets to be sent to be directed to different transmission means according to their priority levels. Thus, in the abovementioned exemplary embodiment, the TBTS with just one level cannot manage the simultaneous sending of several streams. Moreover, the independence between the MLTB and the TBTS risks possibly culminating in an incompatibility between filling and output. The quality of the signal output would be altered thereby for the time it takes to return to normal operation.

SUMMARY OF THE INVENTION

In one particular embodiment of the invention, there is proposed a method of adapting a scalable data stream organized in blocks of data units, each comprising at least one basic data unit and at least one enhancement data unit, making it possible to define a plurality of quality and bit rate levels depending on the number and the type of data units used, each data unit being initially classified in an initial level selected from said plurality of levels. This method implements a regulation mechanism such that, if a data unit is reclassified in a reclassification level different from the initial level of said data unit, all the data units that depend on the decoding of said reclassified data unit are also reclassified in reclassification levels where all the data units essential to their decoding are accessible.

The general principle of the invention therefore consists in taking into account, dynamically, the impact of the reclassification of a data unit on the classification of the other data units that depend on that reclassified data unit. Thus, the stream can be sure to be decoded correctly by the user's terminal.

It should be noted that the reclassification of a data unit does not involve a new marking (and therefore any modification) of this data unit. This reclassification is not therefore borne by the reclassified data unit, and is managed entirely and uniquely by the device implementing the inventive adaptation method. However, as indicated hereinbelow, in a particular embodiment of the invention, this reclassification results in a change of transmission means to which the reclassified data unit is directed.

It should also be noted that if the processing of a data unit at the input of a buffer memory of FIFO type leads to a reclassification, there is a first embodiment of the invention wherein it is this data unit that is reclassified (see hereinbelow, the detailed "simplified compensation" algorithm), and a second embodiment of the invention wherein there can be one or more data units reclassified out of this data unit and all the data units already present in the same buffer (see hereinbelow, detailed "complete compensation" algorithm).

Advantageously, each data unit is directed to a transmission means associated with the level in which said regulation mechanism has ultimately classified or reclassified said data unit. M different transmission means are used, with $1 \leq M \leq R$, where R is the number of quality and bit rate levels.

Thus, the distribution of the data units is modified either in a single transmission means, or among several transmission means. In the latter case, without again undergoing marking (that is, without being modified), the data units can be redirected from one transmission means to another, and the use of the different transmission means is thus optimized.

In an advantageous exemplary embodiment, each regulation level is associated with a distinct transmission means (M=R).

Advantageously, at least one of the reclassification levels is such that the data units that are reclassified therein are not transmitted. It is, for example, a bin-forming hypothetical level, that is not part of the plurality of quality and bit rate levels.

According to an advantageous characteristic, said regulation mechanism comprises a multi-level token bucket (MLTB) type algorithm. In other words, the general concept of the present invention (reclassification of the data units taking into account dependency between data units classified in different levels) can be combined with that of the MLTB, so benefitting from all the advantages associated with the MLTB.

Advantageously, a data unit is reclassified if a bit rate resource available for the initial level of said data unit is insufficient.

It should be noted that a data unit can also be reclassified for other reasons, for example associated with the resources of the terminal of the user receiving the stream.

Advantageously, when the stream comprises a reference data unit, the reclassifications that devolve from reclassifications already performed for data units preceding said reference data unit in the stream are cancelled for the data units that follow said reference data unit in the stream.

Advantageously, said regulation mechanism manages any dynamic modification of a bit rate resource assigned to one of said levels. Thus, the adaptation of the stream can immediately (for example in real time) be improved.

Advantageously, said regulation mechanism takes account of the real transmission time of the data units, to manage the bit rate resources assigned to the levels. In this way, the resources (for example, the bit rate resources) assigned to the different levels can be adjusted and the transport protocol headers that are unknown to the regulation function can be indirectly taken into account.

Advantageously, said regulation mechanism is such that it manages, according to an aggregate mode, the bit rate resources assigned to the levels, such that at least a part of an unused resource of a level can benefit another level whose available bit rate resource is insufficient. This makes it possible to further improve the adaptation of the stream, without exceeding the global bit rate provided for.

According to an advantageous variant, said regulation mechanism is such that it uses an independent mode to manage the bit rate resources assigned to the levels, such that each resource assigned to a level cannot benefit another level. This variant is simpler to manage.

In a first advantageous embodiment of the invention, said regulation mechanism performs a simplified regulation comprising the following steps if the bit rate resource available for the selected initial level is insufficient:
a) a new selected regulation level of lower priority than the preceding selected level is chosen;
b) if the bit rate resource available for the new selected level is sufficient, then said data unit is reclassified in the new selected level;
c) otherwise: if the new level is not the lowest priority of said plurality of quality and bit rate levels, the method returns to the step a), otherwise said data unit is reclassified in a bin-forming hypothetical level.

This first embodiment (simplified regulation) is simple to implement but acts only when the data units are input into the device implementing the inventive method.

In a second advantageous embodiment of the invention, said regulation mechanism performs a complete regulation comprising the following steps if the bit rate resource available for the selected initial level is insufficient:

a) said data unit is classified in the selected initial level;
b) the selected level is chosen as the current level;
c) if the bit rate resource for the current level is not exceeded, the current level is considered to be regulated and the method goes on to the step d); otherwise: at least one data unit to be reclassified is selected from the data units classified in the current level, according to at least one predetermined reclassification criterion, said at least one selected data unit is reclassified in a level of lower priority than the current level, and the step c) is repeated;
d) if the current level is not the lowest priority out of said plurality of quality and bit rate levels, a new current level of lower priority than the preceding current level is chosen then the method returns to the step b), otherwise said complete regulation is finished.

This second embodiment (complete regulation) is more complex than the first, but offers the advantage of acting on all the data units already input and not yet output from the device implementing the inventive method. As detailed hereinafter, the complete regulation is more powerful than the simplified regulation because it allows a better reactivity and a smoothing of the quality of the decoded stream.

In the case of the abovementioned second embodiment, advantageously, for each data unit, the method also comprises a step for assigning to said data unit a weighting from a plurality of possible weightings each associated with a rank of relative priority within a level, said assignment being performed according to at least one assignment rule making it possible to establish a correlation between, on the one hand, said at least one marking indication borne by the data units and, on the other hand, one of the possible weightings. Furthermore, said step for selection of at least one data unit is performed at least according to the weighting of the data units classified in said current level.

The choice of the weightings is consistent with the dependencies between data units. Taking into account the weighting facilitates the selection of the excess data units in a level, following a reclassification.

Advantageously, said step for selection of at least one data unit is performed with the following dual criterion:
 the strongest weighting, out of the weightings assigned to each of the data units; and
 for one and the same weighting, the most recent time reference.

The invention applies advantageously in the case where said scalable data stream is a scalable video stream. In this case, the initial classification of each data unit in an initial level is dependent on at least one marking indication borne by said data unit and comprising an n-uplet of at least two indicators out of the indicators belonging to the group comprising:
 a priority indicator (P);
 a dependency indicator (D), relative to a spatial resolution;
 a time resolution indicator (T); and
 a quality and/or complexity indicator (Q).

Thus, distinctions are exploited between data units (NALUs), the distinctions existing because of the marking of each data unit with a quadruplet of indicators {P, D, T, Q} from an MPEG4-svc coder.

Advantageously, the method is implemented by at least one of the following network elements: stream server and intermediate node of a transmission network.

In another embodiment, the invention relates to a computer program product that can be downloaded from a communication network and/or stored on a medium that that can be read by computer and/or executed by a processor, this computer program product comprising program code instructions for the execution of the steps of the abovementioned method, when said program is executed on a computer.

In another embodiment, the invention relates to a device for adapting a scalable data stream organized in blocks of data units each comprising at least one basic data unit and at least one enhancement data unit, making it possible to define a plurality of quality and bit rate levels depending on the number and the type of data units used, each data unit being initially classified in an initial level selected from said plurality of levels. This device comprises regulation means such that, if a reclassification condition is satisfied for a data unit, then said data unit is reclassified in a reclassification level of lower priority than the initial level of said data unit, and all the data units that depend on the decoding of said reclassified data unit are also reclassified in reclassification levels where all the data units essential to their decoding are accessible.

More generally, the adaptation device according to the invention comprises means of implementing the adaptation method as described previously (in any one of its different embodiments).

In another embodiment, the invention relates to a network element comprising an adaptation device as mentioned above.

Advantageously, the network element belongs to the group comprising stream servers and intermediate nodes of a transmission network.

BRIEF DESCRIPTION OF THE DRAWINGS

Other characteristics and advantages of embodiments of the invention will become apparent from reading the following description of a preferred embodiment of the invention, given by way of indicative and nonlimiting example (all the embodiments of the invention are not limited to the characteristics and advantages of this preferred embodiment), and the appended drawings, in which.

DETAILED DESCRIPTION

In all the figures in the present document, identical elements and steps are designated by one and the same numeric reference.

Figure 2:
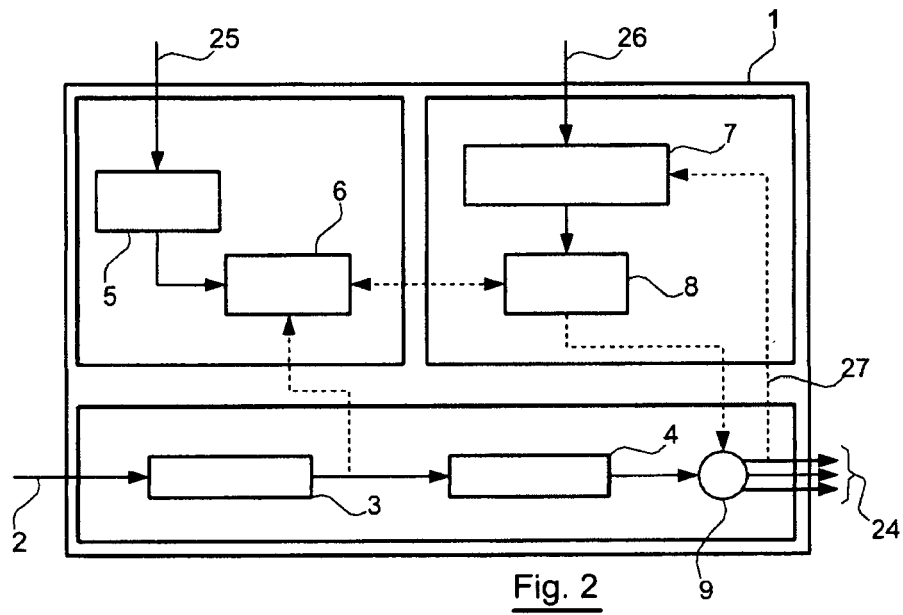
FIG. 2 presents a block diagram of a device for adapting the scalable data streams according to one embodiment of the invention.

Device (FIG. 2)

As illustrated in FIG. 2, in a particular embodiment, the device 1 for adapting scalable data streams according to the invention comprises the following elements (that are described in detail hereinafter):
- a reserve buffer memory 3 (hereinafter called reserve buffer), which receives an MPEG4-svc stream 2;
- a regulation buffer memory 4 (hereinafter called regulation buffer), the input of which is linked to the output of the reserve buffer 3;
- a static classification table 5;
- a dynamic classification table 6;
- a resource adjustment module 7;
- a regulation module 8, making it possible to guarantee the various bit rates requested (arrow referenced 26) for the different regulation levels; and
- a switching module 9, making it possible to switch each of the NALUs present at the output of the regulation buffer 4 according to the regulation level in which the regulation module 8 has classified them. The switching module generates several substreams 24 each corresponding to one of the regulation levels.

In an exemplary embodiment, at least some of the abovementioned means 3 to 9 included in the adaptation device are software means, resulting from the execution of a computer program by a processing unit. In this case, the device comprises a nonvolatile memory storing a computer program implementing the method of adapting streams according to the invention, and a processing unit (microprocessor for example) driven by this computer program. On initialization, the code instructions of the computer program are, for example, loaded into a volatile memory before being executed by the processor of the processing unit.

Figure 1:
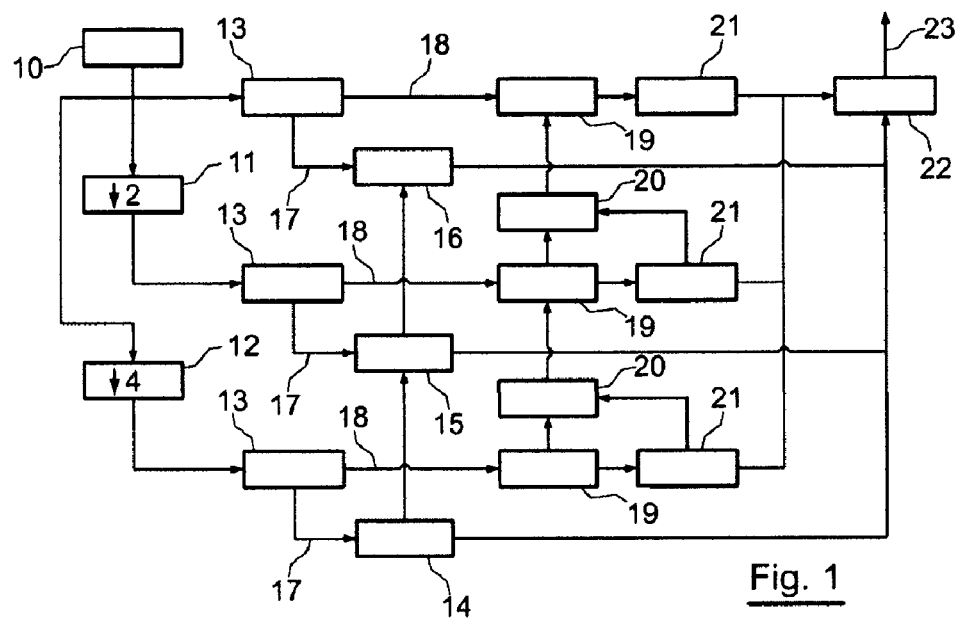
FIG. 1, already described in relation to the prior art, presents a block diagram of an encoder generating an MPEG4-svc stream (scalable video stream)
Figure 4:
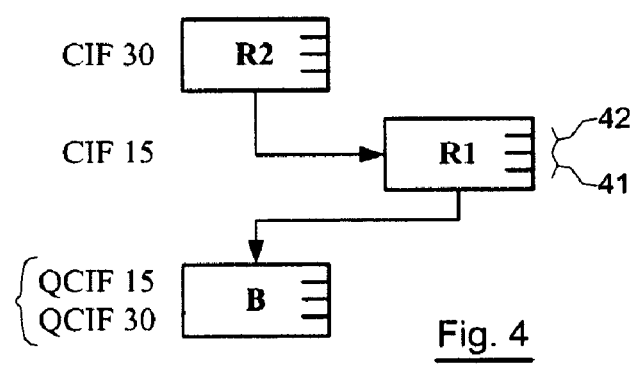
FIG. 4 presents an example of dependencies between NALUs of different coding levels.
Figure 3:
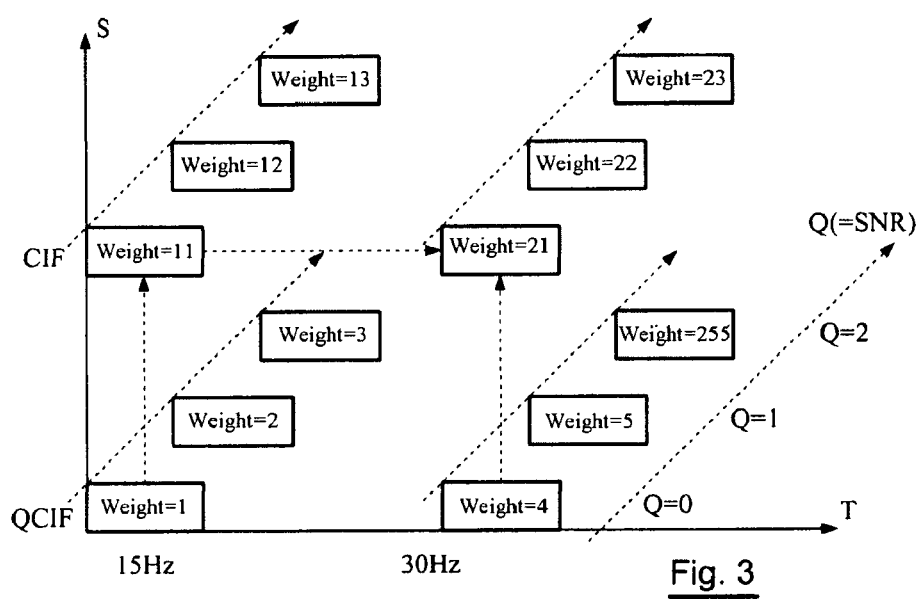
FIG. 3 presents the three scalability axes of an MPEG4-svc stream.

Classification Tables (FIGS. 3 and 4)

The classification tables 5 and 6 contain the different configurations making it possible to distribute the NALUs in the different regulation levels. In fact, they contain correlations between elements present in the additional information of the data and the regulation levels managed by the regulation module 8.

In the case of the NALUs used in MPEG4-svc mode, these elements are indicators present in the header of each NALU, in the form of a quadruplet: {P, D, T, Q} in which:
P indicates the priority;
D indicates the dependency (superset of the spatial resolution S);
T indicates the time resolution; and
Q indicates the quality and/or complexity.

The classification is therefore performed based on the scalability properties of an MPEG4-svc stream.

As illustrated in FIG. 3, an MPEG4-svc stream has three possible scalability axes: spatial axis S (resolution of the image), frequency axis T (frequency of the images) and axis Q, also called SNR (quality) axis, reflecting the level of detail obtained by the truncation of the coefficients derived from the coding. Each NALU is represented by a box.

FIG. 4 presents an example of dependencies between NALUs of different coding levels. In this example, it is assumed that:

the first regulation level (basic level B) is associated with the QCIF15 and QCIF30 codings;

the second regulation level (first enhancement level R1) is associated with the CIF15 coding; and the third regulation level (second enhancement level R2) is associated with the CIF30 coding.

Each coding level comprises, for a given space/time resolution (for example CIF/15 Hz), NALUs of different SNR qualities. It can therefore be said that each coding level comprises a plurality of SNR levels. In other words, a coding level corresponds to a range of bit rates that it is possible to adjust by taking more or fewer NALUs that have different SNRs.

FIG. 4 shows the dependencies between NALUs for accessing a precise quality level. In this example, the coding level CIF30 relies on the coding level CIF15, which in turn relies on the coding level QCIF15 or QCIF30.

In certain cases, all the SNR levels of a coding level are not systematically used by the higher quality coding levels. For example, in FIG. 4, out of the SNR levels of the coding level CIF15, those that are used by the coding level CIF30 are referenced 41 and those that are not 42.

In the exemplary tables presented hereinbelow, the NALUs that are not necessary for the levels above are identified by a high weighting (value 255). When a reclassification need appears, this high value has the effect, in the case of a complete regulation, of favorizing their rejection (reclassification in the bin-forming hypothetical level) or their reclassification in a very low priority level.

Moreover, patent application No. FR0507690 specifies that several fallback modes (also called filtering paths) are possible. It should be noted that, in the embodiment of the present invention, the static 5 and dynamic 6 classification tables correspond to a given fallback mode. For example, the exemplary tables hereinbelow grant priority to the fluidity of the images (QCIF15 and QCIF30 at first level) over the resolution of the display (CIF15 at second level). Another fallback mode would allow for priority to be granted to the resolution of the display (QCIF15 and CIF15 at first level and QCIF30 at second level). In the exemplary tables hereinbelow, the simultaneous presence of QCIF30 and QCIF15 in the first level is justified by the fact that they are needed for decoding the CIF30.

It is obviously possible to change fallback mode, and therefore static (reference) classification table, on the arrival of a reference image. In this case, the dynamic classification table is not updated with the preceding static classification table, but with the new static classification table. Then, the adaptation of the video stream to the bit rate or rates modifies this dynamic classification table as indicated hereinabove.

The classification tables therefore contain a list of correlations in the form: {P, D, T, Q}→(regulation level, weighting within the stream). In other words, each type of NALU, defined by a particular quadruplet {P, D, T, Q}, is associated with a "regulation level" indication and with a "weighting" indication.

The "regulation level" indication corresponds to the regulation level in which the NALU will be assigned. The "weighting within the stream" indication makes it possible to be able to arrange the NALUs in order within one and the same regulation level. This weighting indication is independent of the classification in a regulation level. In a particular embodiment case, this weighting indication is equal to the value P of the NALU header.

The static classification table 5, called reference classification table, is supplied with metadata 25 included in the data accompanying the audiovisual content. It contains the classification levels defined by the content provider.

The function of the dynamic classification table 6 is to take account of the dependencies between the NALUs. It intervenes in the case of modification of the classification by the regulation module. Its objective is to maintain the consistency of the stream. Given that the bit rate regulation can place NALUs of level N in a higher level (or eliminate them: classification in a bin-forming hypothetical level), this dynamic classification table makes it possible to avoid placing in level N NALUs for which the decoding relies on NALUs placed at level N+1 (or eliminated). This dynamic classification table may not contain the weighting elements.

The dynamic classification table is reinitialized with the values of the static classification table on each reference image (image IDR or I).

The content of the static 5 and dynamic 6 classification tables is not static. The correlations evolve in step with the regulation performed by the regulation module, in order to take account of all changes to the constraints. An external decision-making module is responsible for dynamically modifying their content. As a general rule, at any given moment, an incoming NALU of value {P, D, T, Q} can be reclassified in a lower priority level N+k, with k≧1, in order to limit the bit rate of the level N. The updating of the dynamic classification table is such that all the NALUs that then enter into the regulation buffer and that depend on the decoding of this reclassified NALU, will be classified in a level N+m, with m≧k and N+m≦Nmax, where Nmax is the last possible level (that is, the lowest priority level). Only the bin-forming hypothetical level is higher than Nmax.

The classification of an NALU of level N to the level N−1 is pointless in as much as the prior NALUs of the video stream essential to the decoding of this NALU are not all present therein. In other words, the level N−1 is independent of the level N, whereas the level N is dependent on the level N−1 (hierarchical principle).

The table below presents an exemplary static classification table for a three-level regulation. The "Target" column 51 presents, for information, a stream characteristic possibility (coding level).

| Target | P | D | T | Q | Level | Weighting |
|---|---|---|---|---|---|---|
| QCIF 15 Hz | 0 | 0 | 0 | 0 | 1 | 1 |
| | 1 | 0 | 0 | 1 | 1 | 2 |
| | 2 | 0 | 0 | 2 | 1 | 3 |
| QCIF 30 Hz | 0 | 0 | 1 | 0 | 1 | 4 |
| | 2 | 0 | 1 | 1 | 1 | 5 |
| | 3 | 0 | 1 | 2 | 1 | 255 |
| CIF 15 Hz | 0 | 1 | 0 | 0 | 2 | 11 |
| | 3 | 1 | 0 | 1 | 2 | 12 |
| | 4 | 1 | 0 | 2 | 2 | 13 |
| CIF 30 Hz | 0 | 1 | 1 | 0 | 3 | 21 |
| | 4 | 1 | 1 | 1 | 3 | 22 |
| | 5 | 1 | 1 | 2 | 3 | 30 |

The following table presents an exemplary dynamic classification table according to the invention, obtained by updating the exemplary static table hereinabove after regulation of the first regulation level. It will be observed that, in this example, this update relates to two types of NALUs:

the NALUs that have a PDTQ {3,0,1,2} (fifth line) must be reclassified in regulation level 4 (bin-forming hypothetical level); and the NALUs that have a PDTQ {2,0,1,1} (twelfth line) must be reclassified in regulation level 2.

| P | D | T | Q | Level | Weighting |
|---|---|---|---|---|---|
| 0 | 0 | 0 | 0 | 1 | 1 |
| 1 | 0 | 0 | 1 | 1 | 2 |
| 2 | 0 | 0 | 2 | 1 | 3 |
| 0 | 0 | 1 | 0 | 1 | 4 |
| 2 | 0 | 1 | 1 | 2 | 5 |
| 0 | 1 | 0 | 0 | 2 | 11 |
| 3 | 1 | 0 | 1 | 2 | 12 |
| 4 | 1 | 0 | 2 | 2 | 13 |
| 0 | 1 | 1 | 0 | 3 | 21 |
| 4 | 1 | 1 | 1 | 3 | 22 |
| 5 | 1 | 1 | 2 | 3 | 30 |
| 3 | 0 | 1 | 2 | 4 | 255 |

Figure 5:
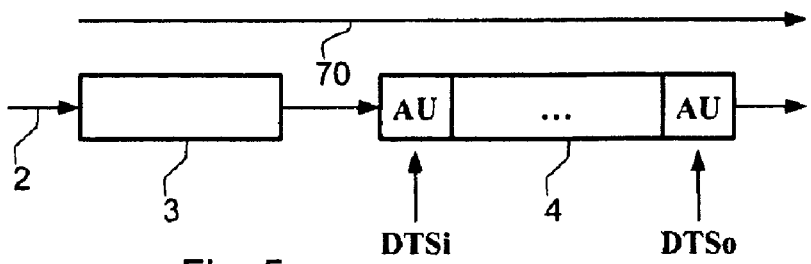
FIG. 5 illustrates the operating principle of the regulation buffer and of the reserve buffer appearing in FIG. 2.

Regulation Buffer and Reserve Buffer (FIG. 5)

FIG. 5 illustrates the operating principle of the regulation buffer and of the reserve buffer.

The regulation buffer 4 contains the data originating directly from the source. It is used mainly to keep the order of arrival of the data in order to facilitate their processing on transmission. In practice, all the data having the same DTS must be transmitted at the same moment, this information pacing the transmission.

It is a FIFO queue, of which the arrow referenced 70 indicates the direction. Since the associated constraint is the calculation of the bit rate of each adaptation level of the regulation function, its size must be fixed throughout the process and it must be constantly filled to be able to perform this calculation. The filling is performed on the basis of the time information of the data. Thus, for the data contained in the regulation buffer, it can be said that: DTSi–DTSo=constant, with DTSi being the DTS value of the last AU input into the regulation buffer, and DTSo the DTS value of the first AU to leave the regulation buffer. In other words, in a normal mode of operation, when the regulation buffer is filled normally, it contains a constant number of images.

In order to synchronize the inputs and outputs, the reserve buffer 3 is added at the input of the regulation buffer 4. The presence of this reserve also makes it possible to group together the NALUs to form the AUs. In practice, the data are processed at the AU level in the regulation buffer 4, but at the NALU level in the regulation module 8.

This reserve also makes it possible to introduce the problem of over-feeding and under-feeding the regulation buffer. Over-feeding corresponds to an input of a larger number of data than the regulation buffer can consume. In this case, the additional data will be stored in the reserve, until the latter is saturated. Finally, if the reserve is considered to have reached its maximum size, the data will no longer be accepted and rejected by the system. Under-feeding corresponds to a consumption of the data that is faster than the input of the data into the regulation buffer. The regulation buffer does not therefore have its optimum size, and the bit rate calculation remains possible, but on an incomplete basis because all the expected data are not present. However, operation is still possible, as long as the regulation buffer is not completely empty because there are always data to be sent over the network as output. Possibly, the transmission is stopped if there are no more data, but only this case poses a problem, because it will not be possible to recover the lost bit rate.

Regulation Module (FIGS. 6 to 14)

General Principle of Regulation

In order to guarantee the various bit rates requested, the regulation module 8 is implemented. It:

receives as input the references of the NALUs contained in the regulation buffer 4 having a pre-established classification;

regulates the NALUs between its levels in order to guarantee the requested bit rates;

updates the dynamic classification table 6. In practice, on reclassification of an NALU from a level N to N+k, it is essential for the dependency data to also be reclassified at least to this level N+k.

An adjustment of the resources may be established according to the target bit rates and indication returns (arrow referenced 27 in FIG. 2) originating from the transmission. This adjustment is performed by the resource adjustment module 7 which can, for example, fine tune the bit rates to take account of the headers of the NALUs sent.

Only the NALUs present in the regulation buffer 4 are managed the regulation module 8.

The switching module 9 directs the NALUs output from the regulation buffer. Each NALU is switched to the transmission means corresponding to the regulation level in which it is classified. Each regulation level has, for example, a different corresponding transmission means, in order to separate the levels. This differentiation can be made at the level of the IP/port addresses, TOS marking, track within a multiplexing, etc. In a variant, there are also several transmission means but several regulation levels are associated with one and the same transmission means. In yet another variant, there is a single transmission means with which are associated all the regulation levels.

Regulation by an MLTB Algorithm

To perform the regulation, the regulation module 8 for example implements a regulation mechanism comprising an algorithm of multi-layer token bucket type (hereinafter called MLTB).

Figure 6:
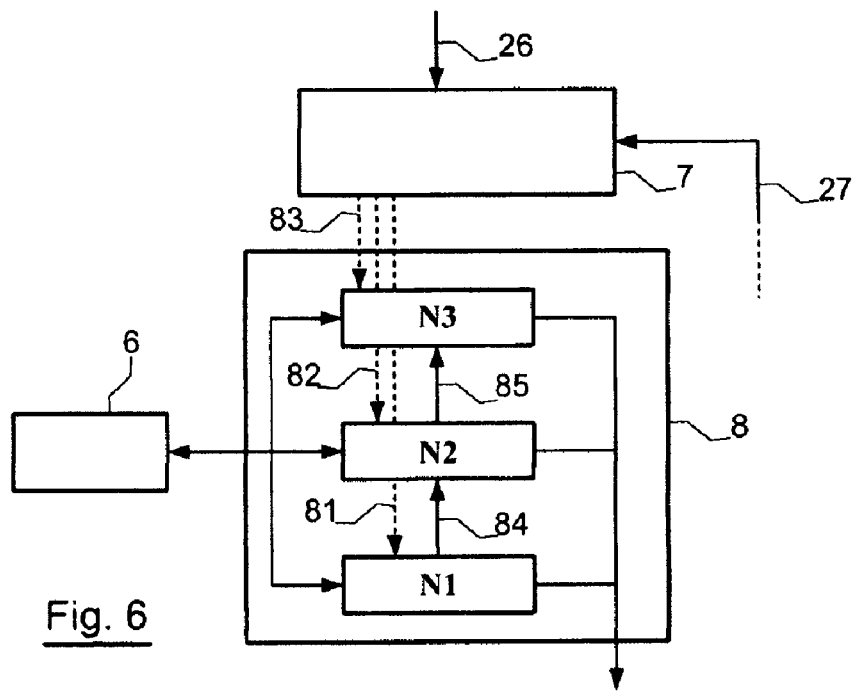
FIG. 6 presents a more detailed view of the regulation module appearing in FIG. 2.

In the example of FIG. 6, the MLTB manages three regulation levels N1, N2 and N3. The arrows referenced 81, 82 and 83 symbolically represent the bit rate resources assigned to each of the regulation levels. The arrow referenced 84 symbolically represents the regulation between the levels N1 and N2. The arrow referenced 85 symbolically represents the regulation between the levels N2 and N3.

Optionally, the MLTB allows for a dynamic change of the bit rate of any regulation level (without modifying the bit rates of the other levels). Thus, change of bit rate of a level instantaneously modifies the tokens allocated to this level, so adapting the regulation to the new bit rate set point.

The data within the MLTB are references (pointers) to the regulation buffer. The smallest item of information is the NALU. The integrity of the AUs and the time concepts are managed only indirectly via the regulation buffer. Only the token concept is used in the calculations of the MLTB.

Compared to the content of the regulation buffer, the data present in the reserve are not taken into account in the MLTB.

As detailed hereinbelow, the MLTB can operate in independent or aggregate mode.

Organization of the Data Between the Regulation Buffer and the MLTB

Figure 7:
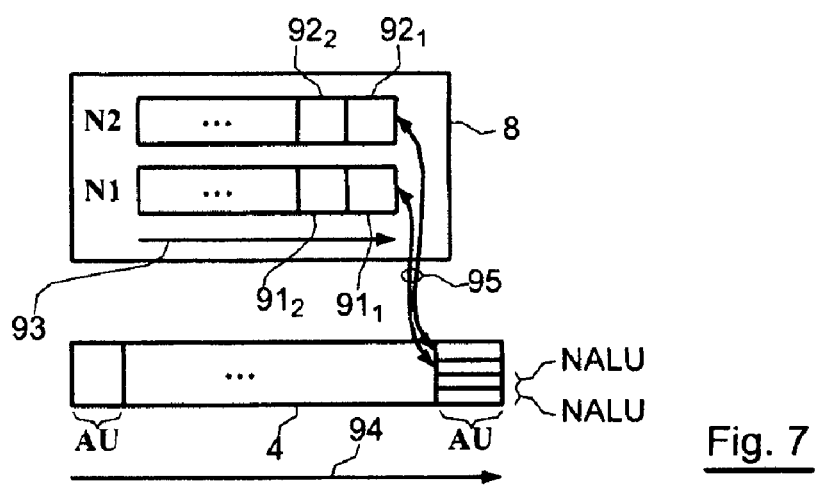
FIG. 7 illustrates a data structure with dual referencing, between the regulation buffer and the MLTB, according to one particular embodiment of the invention.

There now follows a description, in relation to FIG. 7, of a data structure with dual referencing, between the regulation buffer and the MLTB, according to a particular embodiment of the invention.

Each level of the MLTB contains first pointers to the NALUs stored in the regulation buffer 4. For information, each NALU contains a header (including the indicators {P, D, T, Q}) and coding data. In FIG. 7, the first pointers of the level N1 are referenced $91_1$, $91_2$, . . . , those of level N2 are referenced $92_1$, $92_2$, . . . etc.

In each level of the MLTB, the first NALU pointers are classified by order of weighting (as symbolically represented by the arrow referenced 93). For one and the same weighting level, the pointers to the oldest DTS NALUs are placed first. This organization makes it possible to immediately find the lowest priority NALUs (in the case of complete regulation, described hereinbelow). The addition of new NALUs in the MLTB observes this rule.

The data in the regulation buffer is arranged in AU order, and according to the DTS (as symbolically represented by the arrow referenced 94). The order of the NALUs within an AU is immaterial for the regulation performed by the MLTB (the MLTB contains the order of priority). This makes it possible to disregard the order of arrival of the NALUs, for example in case of cooperation of networks with different transfer times.

Besides the effective data, the regulation buffer 4 contains second pointers to the first pointers within the MLTB. This structure with dual referencing (first and second pointers), symbolically represented by the arrows referenced 95, makes it possible to effectively retrieve the NALUs of an AU that are distributed in the MLTB. It is possible to retrieve the information of the NALUs within the regulation buffer, from the first pointers included in the MLTB, and conversely, to retrieve the position of the NALUs within the MLTB, from the second pointers included in the regulation buffer.

Calculation of the Tokens

In the MLTB, a token bucket is assigned for each regulation level, with a number of tokens set according to the bit rate requested for this regulation level and the size of the regulation buffer.

One of the following two methods of calculating the freed tokens is, for example, used:
- tokens_freed=AU_size: the MLTB behaves as a simple average over the regulation buffer, and the bit rate corresponds to the AU level;
- tokens_freed=output_bit_rate*AU_output_time: the MLTB incorporates the IP headers in its calculation. The bit rate corresponds to the IP level.

These two ways of calculating the bit rate can be applied immaterially to the level-independent mode, or to the aggregate mode which takes account of the tokens available in the levels of lower indices (and therefore of higher priorities).

Figure 8:
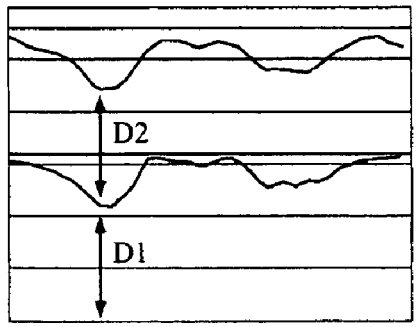
FIGS. 8 and 9 illustrate two operating modes that are independent and aggregated respectively, of the MLTB implemented in the regulation module appearing in FIG. 2.
Figure 9:
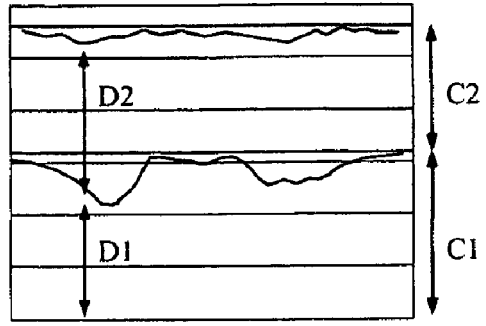

FIGS. 8 and 9 illustrate these two modes of operation, independent and aggregate respectively.

C1 and C2 represent the target bit rates of the respective levels 1 and 2. D1 and D2 represent the effective bit rates.

In the independent mode (FIG. 8), we have the following relationships, relating to the bit rate constraints: $D1 \leq C1$ and $D2 \leq C2$. The bit rate constraints clearly show an underuse of the bandwidth.

In the aggregate mode (FIG. 9), level 2 can benefit from the reserves of level 1 to improve the quality of its transmission. We therefore have the following relationships: $D1 \leq C1$ and $D1+D2 \leq C1+C2$. The overall bit rate constraint is observed, so optimizing the quality by a better use of the bandwidth.

The aggregate mode can be used in another regulation mode than the MLTB. In effect, it is sufficient for the regulation to be able to use, for each level, the available resources of the lower level.

In certain cases, it is advantageous to use an MLTB operating with a mix of independent and aggregate modes.

Figure 10:
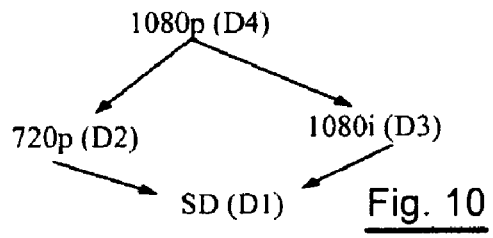
FIG. 10 presents another example of dependencies between different coding levels.

Thus, in the example illustrated in FIG. 10, of a basic stream SD (of target bit rate C1) having HD enhancement streams in 720p mode (of target bit rate C2) and another HD enhancement mode in 1080i mode (of target bit rate C3), these two enhancement modes are independent. The bit rate constraints are then:

$$D1+D2 \leq C1+C2$$

$$D1+D3 \leq C1+C3$$

It would be possible to add a 1080p mode (target bit rate C4) based on the 720p and 1080i modes such that:

$$D1+D2+D3+D4 \leq C1+C2+C3+C4.$$

Organization of the Data in the MLTB

In the use of data originating from SVC streams, certain NALUs take priority. Because of this, the lower priority NALUs will be the first to be reclassified. To define the order of reclassification, the weighting indication present in the classification tables is used as a priority.

Complete Regulation and Simplified Regulation

Two types of regulation are described hereinbelow that can be performed by using an MLTB-type algorithm:
- a complete regulation, implementing all the NALUs contained in the regulation buffer for each regulation level; and
- a simplified regulation acting only at the input of the regulation buffer.

In both cases, the pacing is based on the output of an AU. Thus, to observe the DTS size constraint fixed for the regulation buffer in the normal case of use, a new AU is input into the regulation buffer when an AU is output. The regulation can then be performed.

When an AU is output, the MLTB indicates the distribution of the NALUs of this AU in each of the regulation levels (bit rate levels), to calculate the adjustment of the resources for each regulation level.

Simplified Regulation

Simplified regulation acts only when the data (AUs grouping together NALUs) are input into the regulation buffer. When the quantity of tokens freed by the output of data from the regulation buffer is insufficient to allow a new datum to be input by taking into account only the classification operation, this datum is reclassified in the higher levels of the MLTB. To take account of the dependency problems, the dynamic classification table is updated.

Figure 11:
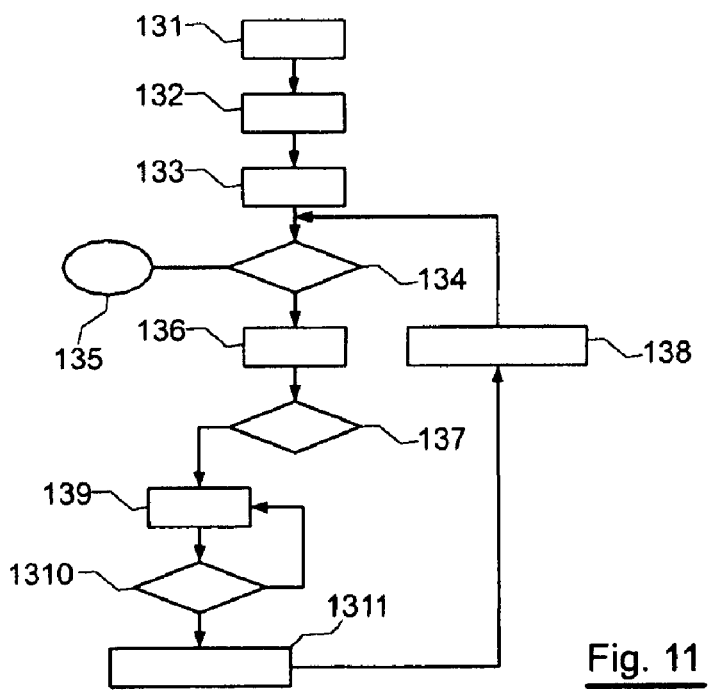
FIG. 11 presents a flow diagram of a particular embodiment of a simplified regulation algorithm implemented by the regulation module appearing in FIG. 2.

There now follows a description, in relation to the flow diagram of FIG. 11, of a particular embodiment of the simplified regulation algorithm.

In a step 131, an event provokes the output of an AU from the regulation buffer. In a step 132, the tokens that were associated with the NALUs of this AU once again become available for the MLTB (according to the token calculation detailed hereinabove). In a step 133, an AU taken from the reserve buffer is imported into the regulation buffer. In this standard scenario, an output AU has a corresponding input AU. The classification is applied sequentially to each NALU of the input AU, thanks to the tokens available in the MLTB.

Then, in a step 134, a test is carried out to detect whether all the NALUs that constitute the input AU have been processed. If they have, the algorithm goes on to the end step 135. Otherwise, in a step 136, an NALU is taken for processing, then in a step 137, a test is carried out to detect whether the available tokens of the requested regulation level N (according to the dynamic classification table) are sufficient for the NALU.

If the available tokens of the level N are sufficient, then, in a step 138, the NALU is classified in the level N and the tokens of the level N are assigned to it. Then, the algorithm returns to the step 134.

If the available tokens of the level N are insufficient for the NALU, then, in a step 139, the regulation level N+1, of lower priority than the level N, is chosen. Then, in a step 1310, a test is carried out to detect whether the available tokens of the regulation level N+1 are sufficient for the NALU:

- if the available tokens of the level N+1 are sufficient, then the algorithm goes on to the step 1311 for modification of the dynamic classification table (to take account of the dependencies) before going on to the step 138 in order for the NALU to be reclassified in the level N+1 and the tokens of the level N+1 to be assigned to it;
- if the available tokens of the regulation level N+1 are insufficient for the NALU, the algorithm returns to the step 139. The last passage through the step 139 consists in choosing the bin-forming hypothetical regulation level, and in this case, the test of the step 1310 that follows is considered to be satisfied and the algorithm therefore goes on to the step 1311.

The benefit of this simplified regulation is the low complexity of the algorithm. It acts only on the data arriving in the system and is based only on the consultation and, where appropriate, an updating of the classification tables.

Complete Regulation

Complete regulation implements all of the regulation. When a new AU is input, the latter is placed in the MLTB based on the classification table. The regulation is then based on all the content of the MLTB by selecting the NALUs that are most appropriate to a reclassification. In effect, when there is a need for reclassification, there may be an NALU in the system that is more able to be reclassified than the new AU.

Figure 12:
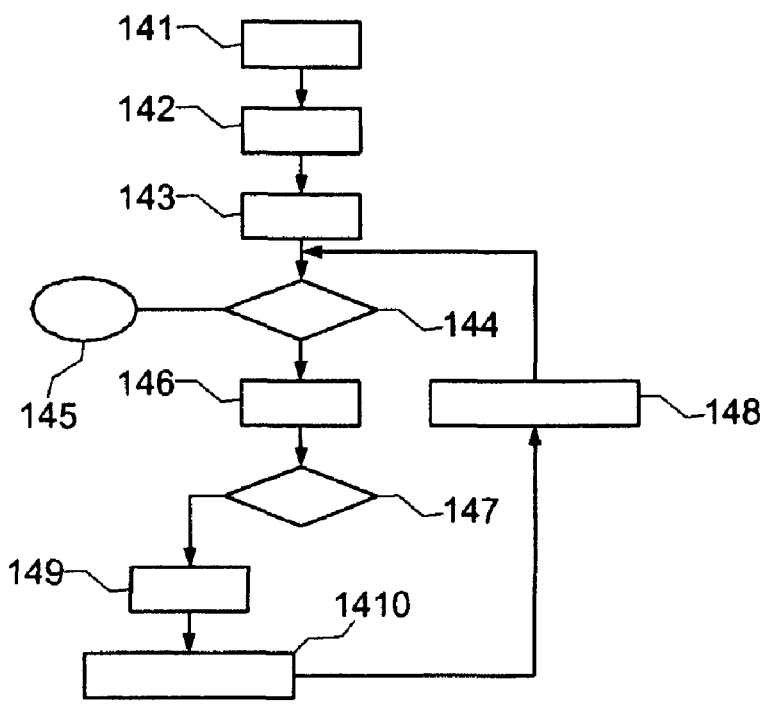
FIGS. 12 and 13 present a flow diagram of a particular embodiment of a simplified regulation algorithm implemented by the regulation module appearing in FIG. 2 (FIG. 13 details the step for adjustment of the regulation levels, that appears in FIG. 12)

There now follows a description, in relation to the flow diagram of FIG. 12, of a particular embodiment of the complete regulation algorithm.

In a step 141, an event provokes the output of an AU from the regulation buffer. In a step 142, the tokens that were associated with the NALUs of this AU once again become available for the MLTB. In a step 143, an AU taken from the reserve buffer is imported into the regulation buffer.

Then, in a step 144, a test is carried out to detect whether all the NALUs that constitute the input AU have been processed. If they have, the algorithm goes on to the end step 145. Otherwise, in a step 146, an NALU to be processed is taken, then in a step 147, a test is carried out to detect whether the available tokens of the requested regulation level N (according to the dynamic classification table) are sufficient for the NALU.

If the available tokens of the level N are sufficient, then, in a step 148, the NALU is classified in the level N and the tokens of the level N are assigned to it.

If the available tokens of the level N are insufficient for the NALU, then, in a step 149, a regulation of all the NALUs of all the regulation levels of the MLTB is performed, then, in a step 1410, the dynamic classification table is modified (in order to take account of the dependencies) before returning to the step 144.

Figure 13:
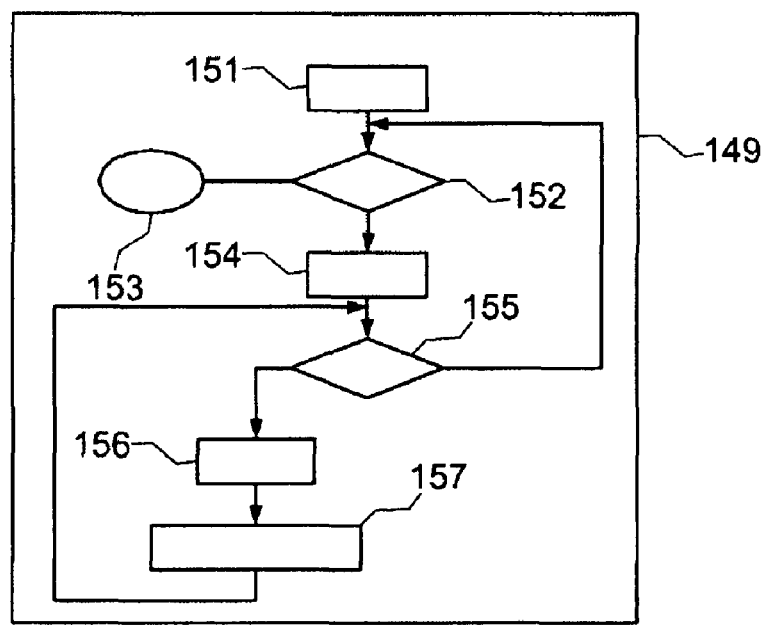

There now follows a description, in relation to FIG. 13, of the detail of the step 149 for adjustment of the regulation levels (regulation of all the NALUs of all the regulation levels of the MLTB).

In a step 151, the input NALU is added to the level N. The number of tokens available in this regulation level is then likely to become negative if, before the addition, there were not enough tokens available. Despite everything, the NALU is added because it must be taken into account in the future search.

Then, in a step 152, a test is carried out to detect whether all the regulation levels to be processed (namely the level N and the levels of lower priority) have been processed. If they have, the algorithm goes on to the end step 153. Otherwise, in a step 154, a new current regulation level is taken to be processed (beginning with the level N, then, on each iteration, going on to the next level N+1 of lower priority), then, in a step 155, a test is carried out to detect whether the number of tokens available for the current level is correct (that is, greater than or equal to zero).

If the number of tokens available for the current level is correct, the level is considered to be regulated and the algorithm returns to the step 152.

If the number of tokens available for the current level is incorrect, the algorithm goes on to a step 156 for selection of the NALU, from those classified in the current regulation level, that has the least dependency. One selection criterion consists in taking the NALU that has the highest weighting and the most recent DTS. In a step 157, the selected NALU is reclassified at the level N+1, so freeing the tokens that were associated with it. Then, the algorithm returns to the step 155, to check whether the reclassification of this NALU has been sufficient.

The last passage through the step 157 consists in a reclassification in the bin-forming hypothetical regulation level, and in this case, the test of the step 155 that follows is considered to be satisfied and the algorithm therefore returns to the step 152.

Figure 14:
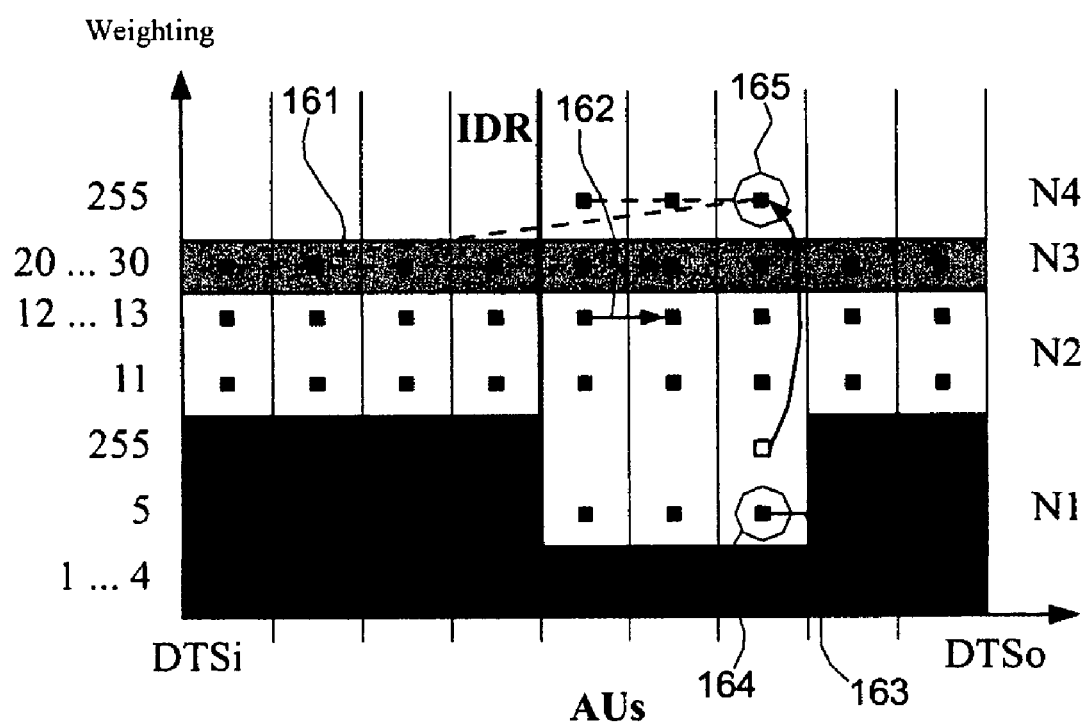
FIG. 14 presents an exemplary distribution of the NALUs in the different regulation levels.

FIG. 14 presents an exemplary distribution of the NALUs (represented by black squares) in three possible regulation levels N1, N2, N3 and a bin-forming hypothetical regulation level N4.

Each AU is represented by a column of NALUs that can have a different number of NALUs. During the regulation, the NALUs are selected to be assigned to a regulation level.

The number of NALUs classified in a regulation level can vary from one DTS to another, according to the bit rate assigned to this regulation level. Thus, in this example, a reduction in the bit rate assigned to the level N1 can be noted, between the second and third DTSs (starting from DTSo), followed by an increase in this bit rate between the fifth and sixth DTSs. In a complementary way, an increase in the bit rate assigned to the level N2 can be noted, between the second and third DTSs, followed by a reduction of this bit rate between the fifth and sixth DTSs. On the other hand, the bit rate assigned to the level N3 remains constant.

On a change of bit rate, the dependencies are taken into account on the selection of the NALUs. Thus, an NALU will have no dependency with respect to another NALU placed in a higher level (of lower priority).

The dotted arrow referenced 161 illustrates the browsing order for the reclassification of the NALUs. The NALUs reclassified first are those that have the strongest weighting and the most recent DTS (close to DTSi).

Each of the arrows referenced 162 and 163 illustrates the dependency between two NALUs. It will be recalled that an NALU of a regulation level N can depend only on an NALU of the same regulation level N or of a lower priority regulation level N' (N'>N).

This FIG. 14 also illustrates the (re)classification of two NALUs, according to the exemplary dynamic classification table hereinabove (see the fifth and twelfth lines), following a reduction of the bit rate assigned to the level N1:

- the NALU referenced 164 is (re)classified in the level 2; and
- the NALU referenced 165 is (re)classified in the level 4 (bin).

The complexity of the complete regulation algorithm is increased compared to that of the simplified regulation, because it is necessary to consult, even modify, all the NALUs contained in the regulation buffer, and this has to be done each time a new datum is introduced.

The advantage of the complete regulation is responsiveness. In effect, all the data present in the system are regulated when constraints change. Thus, the data transmitted just after the change will already observe these new constraints.

Another benefit of this complete regulation is to smooth the quality of the decoded stream, by regulating the classification of the NALUs over the entire regulation buffer.

The order of selection of the reclassified NALUs optimizes the quality by following an order that observes the dependencies.

The invention claimed is:

1. A method on a computing device for adapting a scalable data stream organized in blocks of data units, each comprising at least one basic data unit and at least one enhancement data unit, defining a number R of quality and bit rate levels depending on the number and the type of data units used, said number R of levels being associated to respective different priorities said method comprising:
receiving said scalable data stream and storing said scalable data stream in a buffer;
classifying each basic or enhancement data unit into an initial level selected from said number R of levels;
implementing a regulation mechanism comprising reclassifying a first data unit from the data stream, previously classified in an initial level, in a reclassification level from said number R of levels, said reclassification level having a lower priority than the initial level of said first data unit, determining all the data units from the data stream that depend on the decoding of said reclassified data unit, and then reclassifying the determined data units in reclassification levels from said number R of levels having the same priority as or a higher priority than that of the reclassification level of said first data unit;
transmitting each data unit from said buffer to a data transmission means associated with the level in which said regulation mechanism has ultimately classified or reclassified said data unit, wherein M different transmission means are used, with $1 \leq M \leq R$.

2. The method as claimed in claim 1, wherein at least one of the reclassification levels is such that the data units that are reclassified therein are not transmitted.

3. The method as claimed in claim 1, wherein a data unit is reclassified if a bit rate resource available for the initial level of said data unit is insufficient.

4. The method as claimed in claim 3, wherein said regulation mechanism performs a simplified regulation comprising the following steps if the bit rate resource available for the selected initial level is insufficient:
a) a new selected regulation level of lower priority than the preceding selected regulation level is chosen;
b) if the bit rate resource available for the new selected level is sufficient, then said data unit is reclassified in the new selected level;

c) otherwise, if the new level is not the lowest priority of said plurality of quality and bit rate levels, the method returns to the step a), otherwise said data unit is reclassified in a bin-forming hypothetical level.

5. The method as claimed in claim 1, further comprising:
selecting at least one data unit for reclassification with the following dual criterion:
a strongest weighting, out of weightings assigned to each of the classified data units; and
for one and the same weighting, a most recent time reference.

6. The method as claimed in claim 1, wherein said scalable data stream is a scalable video stream, and in that the initial classification of each data unit in an initial level is dependent on at least one marking indication borne by said data unit and comprising an n-uplet of at least two indicators out of the indicators belonging to the group comprising:
a priority indicator;
a dependency indicator, relative to a spatial resolution;
a time resolution indicator; and
at least one of a quality or complexity indicator.

7. A non-transitory computer-readable storage medium comprising a computer program product that can be downloaded from a communication network and that can be read by computer, said computer program product comprising program code instructions for the execution of the steps of the method as claimed in claim 1, when said program is executed on a computer.

8. A computing device for adapting a scalable data stream organized in blocks of data units each comprising at least one basic data unit and at least one enhancement data unit, defining a number R of quality and bit rate levels depending on the number and the type of data units used, said number R of levels being associated to respective different priorities said device comprising:
a receiver that receives said scalable data stream;
a buffer that stores said received said scalable data stream;
a classifier that classifies each basic or enhancement data unit into an initial level selected from said number R of levels;
a processor that is a CPU and executes instructions of an algorithm for a regulator that regulates to reclassify a first data unit from the data stream, previously classified in an initial level, in a reclassification level from said number R of levels, said reclassification level having a lower priority than the initial level of said first data unit, and that determines all the data units from the data stream that depend on the decoding of said reclassified data unit and then reclassifies the determined data units in reclassification levels from said number R of levels having the same priority as or a higher priority than that of the reclassification level of said first data unit; and
a transmitter that transmits each data unit from said buffer to a data transmission means associated with the level in which said regulation mechanism has ultimately classified or reclassified said data unit, wherein M different transmission means are used, with $1 \leq M \leq R$.

9. A network element, comprising an adaptation device as claimed in claim 8.

* * * * *